United States Patent [19]

von Haas et al.

[11] Patent Number: 4,906,294

[45] Date of Patent: Mar. 6, 1990

[54] CUTTING TOOL PRODUCED BY SINTERING A BLANK FORMED BY A PRESSING TOOL

[75] Inventors: Rainer von Haas, Geesthacht; Helmut Morbitzer, Essen; José A. Payá, Mülheim, all of Fed. Rep. of Germany

[73] Assignee: Fried. Krupp Gesellschaft mit beschränkter Haftung, Essen, Fed. Rep. of Germany

[21] Appl. No.: 184,571

[22] Filed: Apr. 21, 1988

[30] Foreign Application Priority Data

Apr. 21, 1987 [DE] Fed. Rep. of Germany ....... 3713334

[51] Int. Cl.⁴ .............................................. G22F 1/00
[52] U.S. Cl. ..................................... 75/228; 175/409; 299/79; 419/38; 419/66
[58] Field of Search ...................... 419/38, 66; 75/228; 175/409; 299/79

[56] References Cited

U.S. PATENT DOCUMENTS

| | | | |
|---|---|---|---|
| 2,747,231 | 5/1956 | Reinhardt | 18/59.3 |
| 4,189,265 | 2/1980 | Arnold et al. | 407/114 |
| 4,298,563 | 11/1981 | De Santis et al. | 419/38 |
| 4,397,889 | 8/1983 | Benjamin et al. | 419/33 |
| 4,478,888 | 10/1984 | Benjamin et al. | 419/33 |

OTHER PUBLICATIONS

"Indexable turning inserts with chipbreaker grooves," Krupp Widia Technical Information, HVT88.524, published Sep./Oct. 1988, pp. 1–8.
"Wendeschneidplatten mit Spanformgeometrien," Krupp Widia Technische Information, HVT88.024, published May/Jun. 1988, pp. 1–8.

Primary Examiner—Stephen J. Lechert, Jr.
Attorney, Agent, or Firm—Spencer & Frank

[57] ABSTRACT

A cutting bit (1) has a bottom side (2), flanks (3) that are inclined at a positive clearance angle ($\alpha$) with respect to the bottom side (2), and a top side (7). The top side (7) has cutting edges (5 and 5') which are inclined with respect to one another at an angle of inclination ($\lambda$). The cutting bit is made by sintering a blank which is formed using a pressing tool (10). The pressing tool includes a mold member (11), an upper die (12), and a lower die (13). The upper die (12) has a pressure face (20) which corresponds precisely, except for an allowance for the shrinkage ratio of the sinter material, to the actual surface of the upper side of the cutting bit (1). When the upper die (12) is fully inserted into the mold (11), a free space (31) exists between the upper die (12) and the mold member (11), the free space being disposed above the delimiting line (21) of pressure face (20) of the upper die (12).

7 Claims, 6 Drawing Sheets

CUTTING TOOL PRODUCED BY SINTERING A BLANK FORMED BY A PRESSING TOOL

BACKGROUND OF THE INVENTION

The present invention is directed to a pressing tool for forming a blank of compressed sinter material, and to a cutting bit formed by sintering the blank.

Cutting bits such as reversible cutting plates can be produced by sintering from pressed blanks. Such blanks shrink during sintering at a so-called shrinkage ratio which is a function, in particular, of the material being sintered.

A pressing tool for pressing the blanks includes a mold member cooperating with an upper die and a lower die. Generally the lower die, and a recess in the mold member provided to guide it, have large cross sections which correspond to the bottom surface of the cutting bit after allowances are made for the shrinkage ratio. For the upper die, which is also guided in the mold member, the cross section of the upper die and the recess provided to guide it correspond (again after allowing for the shrinkage ratio) to a surface defined by the upper corner points of the cutting bit and to imaginary straight lines connecting them.

Cutting bits may have flanks that are inclined with respect to the bottom side. To make the blanks for such cutting bits using a pressing tool which employs an upper die and a lower die guided in a mold member, the mold member has transition faces, from the upper guide recess to the lower guide recess, which correspond (disregarding the shrinkage ratio) to the flanks of the cutting bits and which are inclined at the same clearance angle. Assuming that the flanks are planar, in the mold member the transitions from the perpendicular sides of the upper guide recess to the corresponding transition faces are formed by straight edges or intersections at angles to one another, respectively.

A so-called negative cutting bit lacks a clearance angle, i.e. has flanks which are perpendicular to the bottom side, with or without inclined cutting edges. A so-called positive cutting bit has a clearance angle $\alpha > 0$ and cutting edges along an imaginary straight line, i.e. not inclined, the cutting edges being continuous from corner to corner. Blanks for such negative and positive cutting bits can easily be pressed into the final or finished form, disregarding the shrinkage ratio. However blanks pressed with known pressing tools for positive cutting bits which have a clearance angle $\alpha > 0$ and which have cutting edges inclined at an angle $\lambda$, with such cutting edges having a non-linear shape between two adjacent corners when seen from the top, have a section of roughly 1 mm in height at their upper side which has peripheral or flank faces without a clearance angle as a result of the perpendicular peripheral or guide surfaces of the upper die. The flanks are overdimensioned and follow at the lower edge of these peripheral faces. To finish the sintered cutting bits, the flanks must still be ground by essentially an amount of $1 \text{ mm} \times \sin \alpha$.

Attempts have already been made to provide the upper die with a slope which is inclined at a clearance angle $\alpha$ between the highest and lowest points of the lines defining the pressure face of the upper die. However, such attempts have resulted in a local increase in pressure at the end of the pressing stroke, in conjunction with the transition faces of the mold member, which faces slope at the same clearance angle, due to clamped-in sinter material. A danger of destruction exists, particularly for the upper die.

SUMMARY OF THE INVENTION

It is an object of the invention to eliminate the additional process step of grinding the flank faces in the production of a cutting bit having planar flanks and a positive clearance angle as well as sloped cutting edges, without running the risk of part of the tool being destroyed.

This is accomplished according to the invention in that the pressing tool has an upper die with a pressure face which corresponds precisely to the top side of the cutting bit, expanded by a factor to accommodate shrinkage of the blank during sintering, and in that a free space between the upper die and the mold member is provided when the upper die is in its lowermost operating position, the free space being disposed above and adjacent a delimiting line around the pressure face of the upper die. Due to the fact that the pressure face of the upper die corresponds (after allowing for the shrinkage ratio of the sintered material) to the upper side of the cutting bit, the delimiting line of the pressure face of the upper die corresponds to the cutting edge ratio of the cutting bit. Since, beginning with the delimiting line, a free space exists in the pressing tool above the delimiting line, in this region material cannot be compressed locally since no corresponding counterface exists in the region of the free space. The boundary line of the pressure face of the upper die is thus able to extend essentially to the sloping inner faces of the mold member. In a blank produced with such a pressing tool and in the cutting bit sintered from such a blank, the sloping flanks thus begin directly at the cutting edges. The upper region of the cutting bit is completely formed after the sintering process and no grinding of the flanks is required. The thus-completed cutting bit may subsequently be additionally provided with a coating.

In accordance with one aspect of the invention, the upper die is guided in the mold member in a particularly simple manner. However, it is also possible to guide the upper die along other guide elements, such as guide columns, which are connected with the mold member.

In accordance with another aspect of the invention, the free space between the upper die and the mold member may extend into the upper die, which can be accomplished by simple outline grinding. In the simplest case, the side faces of the upper die adjacent the delimiting line of the pressure face are kept parallel to the direction of movement of the upper die.

To increase the free space, the side surfaces of the upper die may either slant inwardly or communicate with a groove or an undercut.

To keep the free space clean before every new filling and pressing process, a suction channel may be provided in the mold member.

A cutting bit which is sintered from a blank pressed in the pressing tool according to the invention is not overdimensioned at its flanks when it is manufactured. For example, the flanks extend exactly up to the cutting edges. The cutting bit is thus finish sintered and need not be worked further, particularly at its flanks, for example by grinding. Only at the bottom side may subsequent grinding—as customary—be of advantage.

DESCRIPTION OF THE PREFERRED EMBODIMENTS

Figure 1:
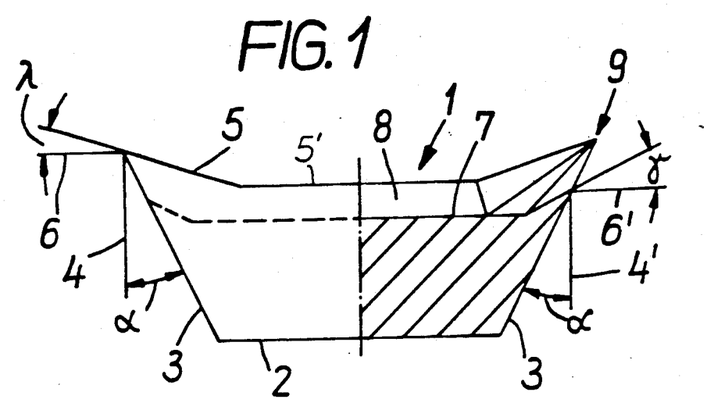
FIG. 1 is a side view, partially in section, of a cutting bit with sloping flanks and inclined cutting edges.
Figure 2:
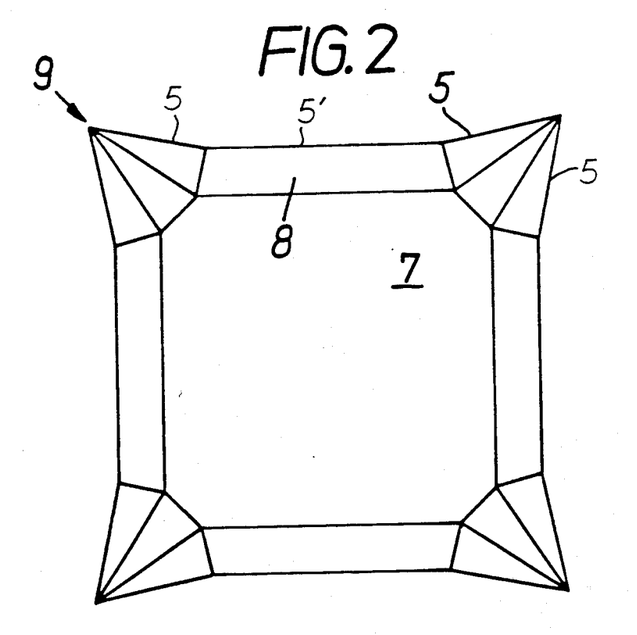
FIG. 2 is a top view of the cutting bit.

The cutting bit 1 according to the embodiment of FIGS. 1 and 2 has a bottom side or face 2 with a square configuration. The planar flanks 3 are inclined at a relief or clearance angle $\alpha$ with respect to the cutting planes 4 and 4' which extend perpendicularly to bottom side 2.

The top side of cutting bit 1 includes corner regions having cutting edges 5 which converge at corner points 9. Between the corner regions, the top side of cutting bit 1 has chip producing cutting faces or strips 8 with cutting edges 5' and a central region or face 7. Cutting bit 1 has a positive rake angle $\gamma$ with respect to a reference plane 6', which is parallel to bottom face 2 through cutting edge 5'. The cutting edges 5 at the corner regions are inclined upward at an angle $\lambda$ with respect to a reference plane 6, which is parallel to bottom face 2, too, or, in this embodiment, with respect to the cutting edges 5' along the cutting faces 8 between the corner regions, respectively. For reasons of a simplified illustration, the cutting edges 5 and 5' are shown only in straight lines and the angle ratios are greatly exaggerated to make them clearer.

Figure 10:
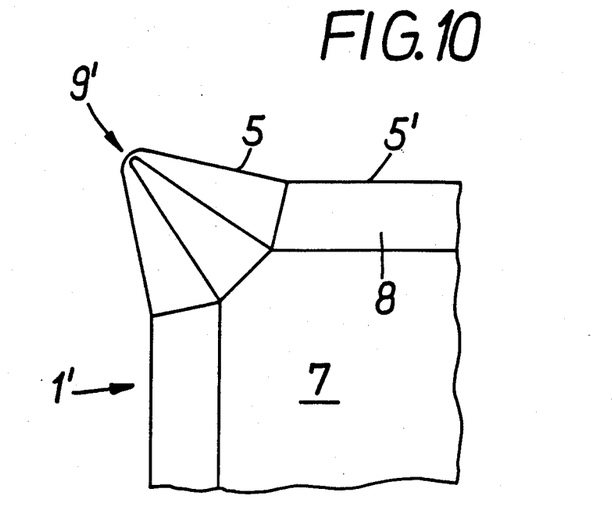
FIG. 10 is a top view of a portion of a cutting bit with rounded corner regions.
Figure 11:
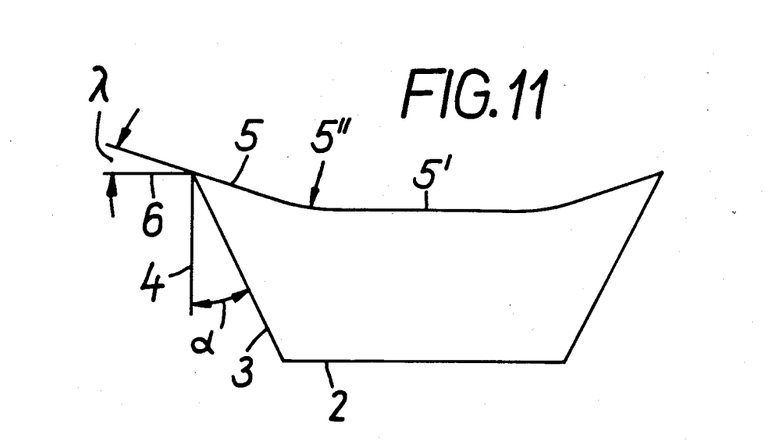
FIG. 11 is a side view of a cutting bit with sloping flanks, inclined cutting edges and transitional arcs between different parts of the cutting edge.

However, in modification of the illustrated embodiment, corner points 9' of cutting bit 1' may be rounded (as shown in FIG. 10) and the cutting edges 5 and 5' may have rounded intersections or transitional arcs 5" (as shown in FIG. 11). Moreover, cutting bit 1 or 1' may also have another, basic shape, e.g. rhombic, and/or be provided with a center recess (as shown, e.g. in U.S. Pat. No. 4,189,265, FIG. 6).

As will be discussed in more detail below, cutting bit 1 is made by sintering a blank of compressed material. The blank (not shown separately) is larger than the finished cutting bit to accommodate shrinkage of the material during sintering, but is otherwise entirely identical in shape with the cutting bit 1.

Figure 3:
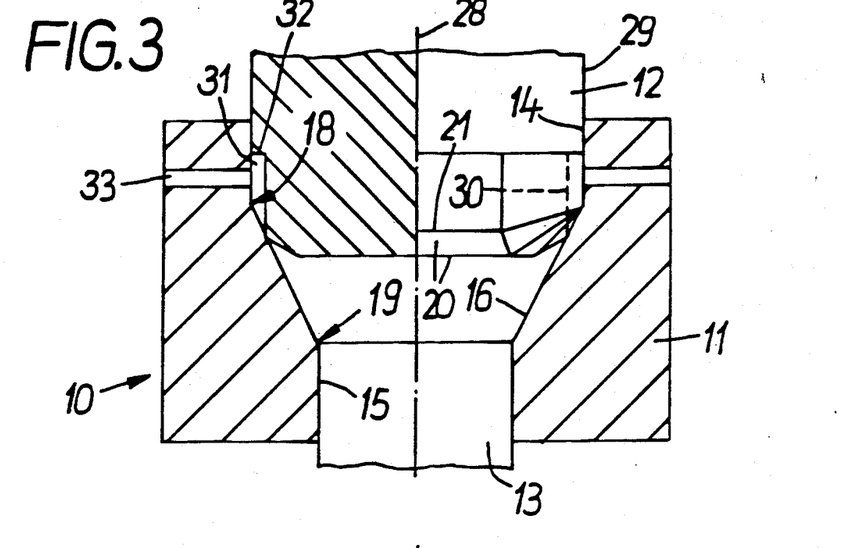
FIG. 3 is a cross-sectional view of a pressing tool.

The pressing tool 10 shown in FIG. 3 is employed for shaping and pressing the blank. Pressing tool 10 is essentially composed of a mold member 11, an upper die 12, and a lower die 13. Upper die 12 and a recess 14 provided to guide the upper die 12 in mold member 11 have a rectangular cross section whose size is determined by the corner dimensions of the cutting bit 1 divided by the shrinkage ratio of the material to be sintered. The lower guide recess 15 and the lower die 13 also have a rectangular cross section which is determined from the bottom side 2 of cutting bit 1 divided by the shrinkage ratio.

Between the upper guide recess 14 and the lower guide recess 15, mold member 11 is provided with planar transition faces 16 which slope at the clearance angle $\alpha$ (see FIG. 1) of cutting bit 1. The perpendicular sides of guide recess and the adjacent portions of transitional faces 16 meet at common edges 18, and the perpendicular sides of guide recess 15 and the transitional face 16 meet at common edges 19.

Figure 4:
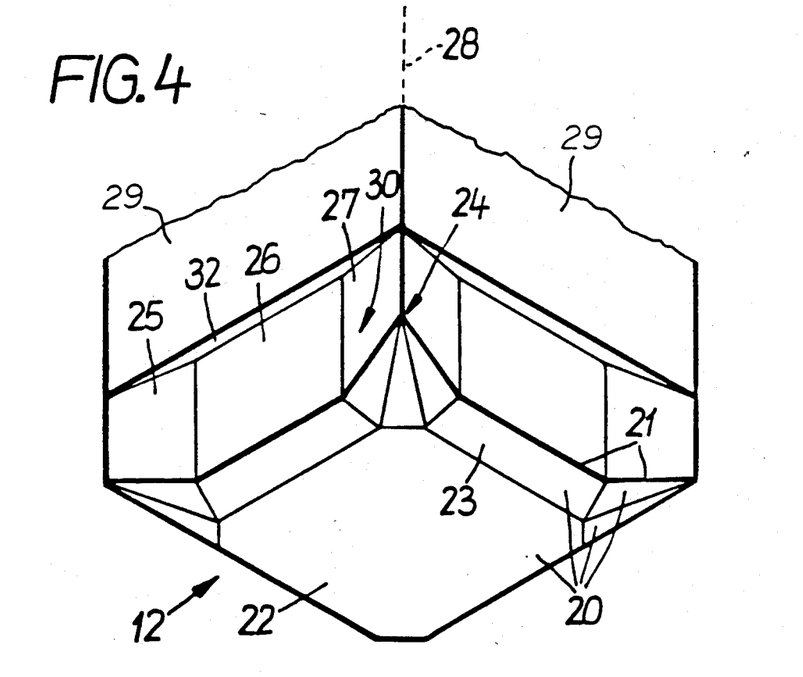
FIG. 4 is a perspective view, seen from below, of the upper die of the pressing tool.

The upper die 12, which is shown in FIG. 4 in a perspective view from the bottom, also has a pressure face 20 at its underside which—disregarding the shrinkage ratio—exactly corresponds to the upper surface of finished cutting bit 1. The delimiting lines or edges 21 of pressure face 20 correspond exactly to cutting edges 5 and 5', and the planar surface 22 of pressure face 20—when seen from the bottom—corresponds to the central region 7 of the top side of cutting bit 1. The sloping surface strips 23 adjacent planar surface 22 correspond to the cutting faces 8 (see FIGS. 1 and 2) and the points 24 farthest back on pressure face 20 correspond to the corner points 9 (see FIGS. 1 and 2) of cutting bit 1. The side face portions 25, 26 and 27 extend upward from the delimiting line 21 of pressure face 20 and are parallel to the direction of movement of the upper die 12 or, more precisely, to its central longitudinal axis 28. Side face portions 25, 26 and 27 can be produced by simple outline grinding. Side face portions 25, 26 and 27 form recesses 30 with respect to guide surfaces 29 disposed thereabove on upper die 12. In conjunction with the guide surfaces of recess 14 and the transitional faces 16 in mold member 11, they form free spaces or cavities 31. The tops of recesses 30 are delimited by transition faces 32.

In mold member 11, conduits 33 (which can be connected to a suction device, not shown) are disposed at the level of recesses 30.

Figure 9:
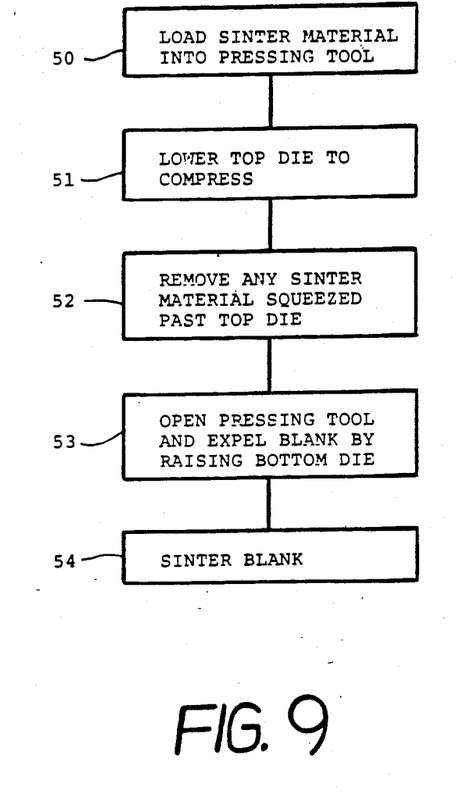
FIG. 9 is a flow sheet illustrating steps in the production of a cutting bit in accordance with the present invention.

The production of a cutting bit 1 using pressing tool 10 will now be described with reference to FIGS. 3 and 9. To shape a blank, upper die 12 is pulled out of the mold member 11 over an additional guide (not shown). The region of the mold member 11 above the lower die 13 is then charged with a measured quantity of sinter material (step 50) and the upper die 12 is pressed onto the sinter material (step 51). The upper die 12 moves downward until delimiting line 21 of pressure face 20 engages the transition faces 16 of mold member 11. Local accumulations of sinter material are avoided since any excess sinter material can escape into the free space 31 formed by recesses 30. The pressure exerted by die 12 during its downward movement initially presses the sinter material into the corners of the mold region between dies 12 and 13, and causes the sinter material to flow into the regions defining what will become cutting faces 8 and corner points 9 (see FIGS. 1 and 2) of the final blank. The pressure within the mold region rises sharply as the gap between delimiting line 21 and transition faces 16 narrows, both because every incremental increase in the pressure in the mold region between dies 12 and 13 increases the friction between the particles of sinter material in the mold region, thereby rendering it less flowable, and because the narrowing gap itself restricts the outward flow of sinter material. As a result, by the time delimiting line 21 contacts transition faces 16 the sinter material in the mold region between dies 12 and 13 is sufficiently compacted that the particles adhere to one another, forming the blank. To clean cavities 31 before the next filling and pressing process, any sinter material that may have collected there can be extracted through suction lines 33 (step 52). After such cleaning the blank can be expelled from mold member 11 (step 53) by raising lower die 13 after upper die 12 has been withdrawn. The blank is thereafter transferred to an oven (not illustrated) for sintering (step 54).

Figure 5:
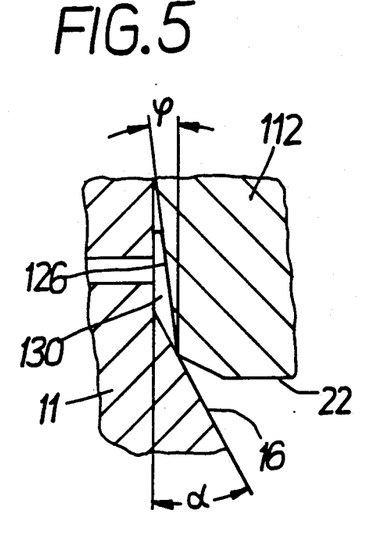
FIG. 5 is a cross-sectional view of a portion of a pressing tool in accordance with another embodiment, and shows a free space disposed at the upper die.
Figure 6:
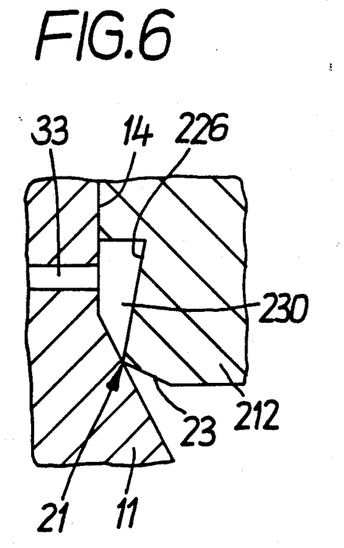
FIG. 6 is a cross-sectional view of a portion of a pressing tool in accordance with a further embodiment.
Figure 7:
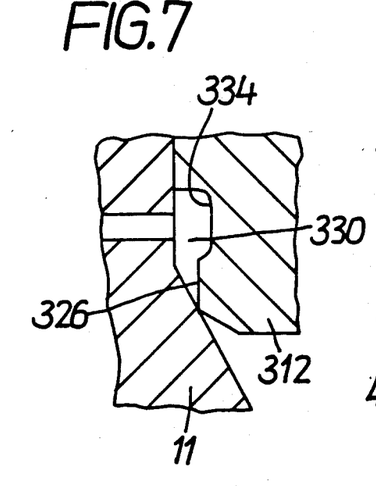
FIG. 7 is a cross-sectional view of a portion of a pressing tool in accordance with an additional embodiment.

FIGS. 5 to 7 are partial cross-sectional views of upper dies having recesses 130, 230, and 330 with shapes different from the recesses 30 of upper die 12. In the embodiment of FIG. 5, the side faces 126 of upper die 112 are inclined outwardly under an angle $\phi$, which is smaller than clearance angle $\alpha$. In the embodiment of FIG. 6, side faces 226 of upper die 212 are retracted inwardly. In the embodiment of FIG. 7, side faces 326 of upper die 312 initially extend parallel to longitudinal axis 28 (see FIG. 4) and are thereafter provided with an undercut or groove 334 in the circumferential direction. The blank-forming procedure using upper dies 112, 212, and 312 is the same as the procedure that was described above with respect to the first embodiment.

Figure 8:
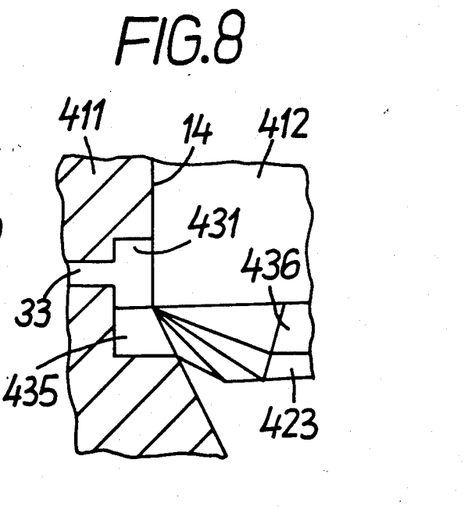
FIG. 8 is a cross-sectional view of a portion of a pressing tool in accordance with yet another embodiment.

In the embodiment of FIG. 8, recess 431 is provided in mold member 411. The delimiting line of the lower inner face 435 of recess 431 corresponds—disregarding the shrinkage ratio—exactly to the configuration of the cutting edges 5 and 5' (see FIG. 2) of the cutting bit 1. Upper die 412 has a surface strip 423, which in this embodiment is inclined at the rake angle $\gamma$ with respect to the horizontal, and is followed by a surface strip 436, which is inclined at the clearance angle $\alpha$ with respect to the normal.

Figure 12:
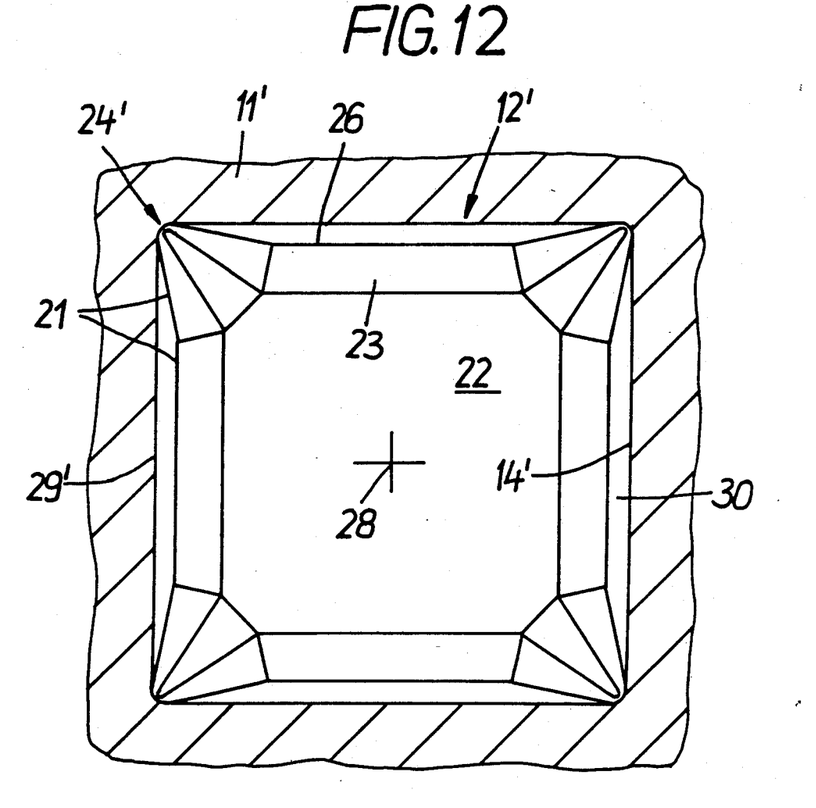
FIG. 12 is a bottom view, partially in section, of an upper die and a mold member having rounded corners.

To press a blank to be sintered to a cutting bit 1' having rounded corners 9' (see FIG. 10) the upper die 12' is formed with rounded corners or edges 24' (see FIG. 12). Die 12' has guide surfaces 29' defined by straight lines or planes, respectively, connecting the rounded edges 24'. The guide surfaces of upper recess 14' of mold member 11' are formed respectively.

According to one specific, exemplary embodiment of the invention the blank may be made of a powder comprising 3.0% TiC, 5.0% TaNbc, 5.5% Co and 86.5% WC (all indications being percent by weight). The grain size of the powder is limited to 10 $\mu$m. The powder may be pressed at a pressure of about 3500 bar and sintered at a temperature of about 1450° C. for a period of 20 hours. The volume of the sintered cutting bit will be less than that of the blank, the linear shrinkage ratio being 20%.

The present disclosure relates to the subject matter disclosed in Federal Republic of Germany patent application No. P 37 13 334.9 of Apr. 21, 1987, the entire disclosure of which is incorporated herein by reference.

It will be understood that the above description of the present invention is susceptible to various modifications, changes and adaptations, and the same are intended to be comprehended within the meaning and range of equivalents of the appended claims.

What we claim is:

1. A cutting bit, comprising: a body of compressed and sintered material, the body having, at the time the material is sintered, a bottom side, a top side with a periphery which includes corner regions and intermediate regions between the corner regions, and flanks which are inclined at a positive clearance angle with respect to imaginary cutting planes that are perpendicular to the bottom side, the intermediate regions of the periphery of the top side having cutting edges and the corner regions of the periphery of the top side having cutting edges which are inclined upward with respect to a reference plane that is parallel to the bottom side.

2. A method for producing a cutting bit having a bottom side, having a top side with a periphery which includes corner regions and intermediate regions between the corner regions, and having flanks which are inclined at a positive clearance angle with respect to imaginary cutting planes that are perpendicular to the bottom side, the intermediate regions of the periphery of the top side having cutting edges and the corner regions of the periphery of the top side having cutting edges which are inclined upward with respect to a reference plane that is parallel to the bottom side, said method comprising the steps of:

(a) loading sinter material into a pressing tool which includes
   an upper die having a guide portion which corresponds to a surface defined by the corner regions of the cutting bit expanded by a predetermined factor and to straight lines connecting the corner regions, the upper die additionally having a pressure face corresponding to the top side of the cutting bit expanded by the predetermined factor and a delimiting line which bounds the pressure face,
   a lower die, and
   a mold member which cooperates with the upper and lower dies, the mold member having a recess for movably receiving the upper die, the recess having a guide portion with a cross section which corresponds to the cross section of the guide portion of the upper die, the upper die having a lowermost position in the recess,
   wherein at least one of the upper die and the mold member is configured so that a free space between the upper die and the mold member exists when the upper die is in its lowermost position in the recess of the mold member, the free space being disposed adjacent and above the delimiting line which bounds the pressure face of the upper die; and (b) compressing the sinter material in the pressing tool to form a blank which is larger than the cutting bit by the predetermined factor.

3. A compressed blank as formed in step (b) of claim 2.

4. The method of claim 2, further comprising the step of sintering the blank formed in step (b).

5. A cutting bit formed by the method of claim 4.

6. A method for producing a cutting bit, comprising the steps of:

(a) forming a compressed blank of sinter material, the blank having
   a bottom side,
   a top side with a periphery which includes corner regions and intermediate regions between the corner regions, the intermediate regions of the periphery having edges and the corner region of the periphery having edges which are inclined upward with respect to the edges of the intermediate regions, and flanks which are outwardly inclined with respect to the bottom side; and (b) sintering the blank.

7. A cutting bit produced by the method of claim 6.

* * * * *